United States Patent

Binder

Patent Number: 5,908,983
Date of Patent: Jun. 1, 1999

[54] METHOD AND APPARATUS FOR TESTING THE BRAKE SYSTEM OF A VEHICLE

[75] Inventor: Juergen Binder, Stuttgart, Germany

[73] Assignee: Robert Bosch GmbH, Stuttgart, Germany

[21] Appl. No.: 08/751,129

[22] Filed: Nov. 15, 1996

[30] Foreign Application Priority Data

Feb. 3, 1996 [DE] Germany ............ 196 03 863

[51] Int. Cl.⁶ .......................... G01M 15/00
[52] U.S. Cl. ............... 73/129; 73/39; 73/132
[58] Field of Search ............ 73/39, 49.7, 121, 73/129, 132

[56] References Cited

U.S. PATENT DOCUMENTS

| | | | |
|---|---|---|---|
| 3,584,500 | 6/1971 | Diehl et al. | 73/39 |
| 3,602,044 | 8/1971 | Markey | 73/132 |
| 3,662,593 | 5/1972 | Pirrello et al. | 73/132 |
| 3,772,914 | 11/1973 | Pohl et al. | 73/39 |
| 3,788,131 | 1/1974 | Markey | 73/132 |
| 3,858,436 | 1/1975 | Hines, Jr. et al. | 73/39 |
| 3,982,429 | 9/1976 | Cline | 73/132 |
| 3,995,475 | 12/1976 | Cline | 73/132 |
| 4,062,224 | 12/1977 | Zeleney | 73/39 |
| 4,076,322 | 2/1978 | Banker et al. | 73/39 |
| 4,100,792 | 7/1978 | Leiber | 73/39 |
| 4,114,430 | 9/1978 | Luepertz et al. | 73/121 |
| 4,186,595 | 2/1980 | Domitter | 73/132 |
| 4,719,796 | 1/1988 | Zenker | 73/121 |
| 4,771,387 | 9/1988 | Hexel et al. | 73/121 |
| 4,870,390 | 9/1989 | Hosoda et al. | 73/39 |
| 5,535,622 | 7/1996 | Walter | 73/121 |

FOREIGN PATENT DOCUMENTS 4014314  12/1991  Germany.
4112137  10/1992  Germany.

*Primary Examiner*—George Dombroske
*Assistant Examiner*—Eric S. McCall
*Attorney, Agent, or Firm*—Fulbright & Jaworski, LLP

[57] ABSTRACT

For the detection of undissolved gas in the brake system; hydraulic pressure is built up and at least one characteristic value for the pressure buildup such as the master cylinder pressure, the brake pedal distance, the drop in storage chamber pressure, etc., is checked to see if it exceeds a predetermined limit value. If this limit value is exceeded, it is assumed that there is an unacceptable amount of undissolved gas in the hydraulic component of the brake system.

12 Claims, 5 Drawing Sheets

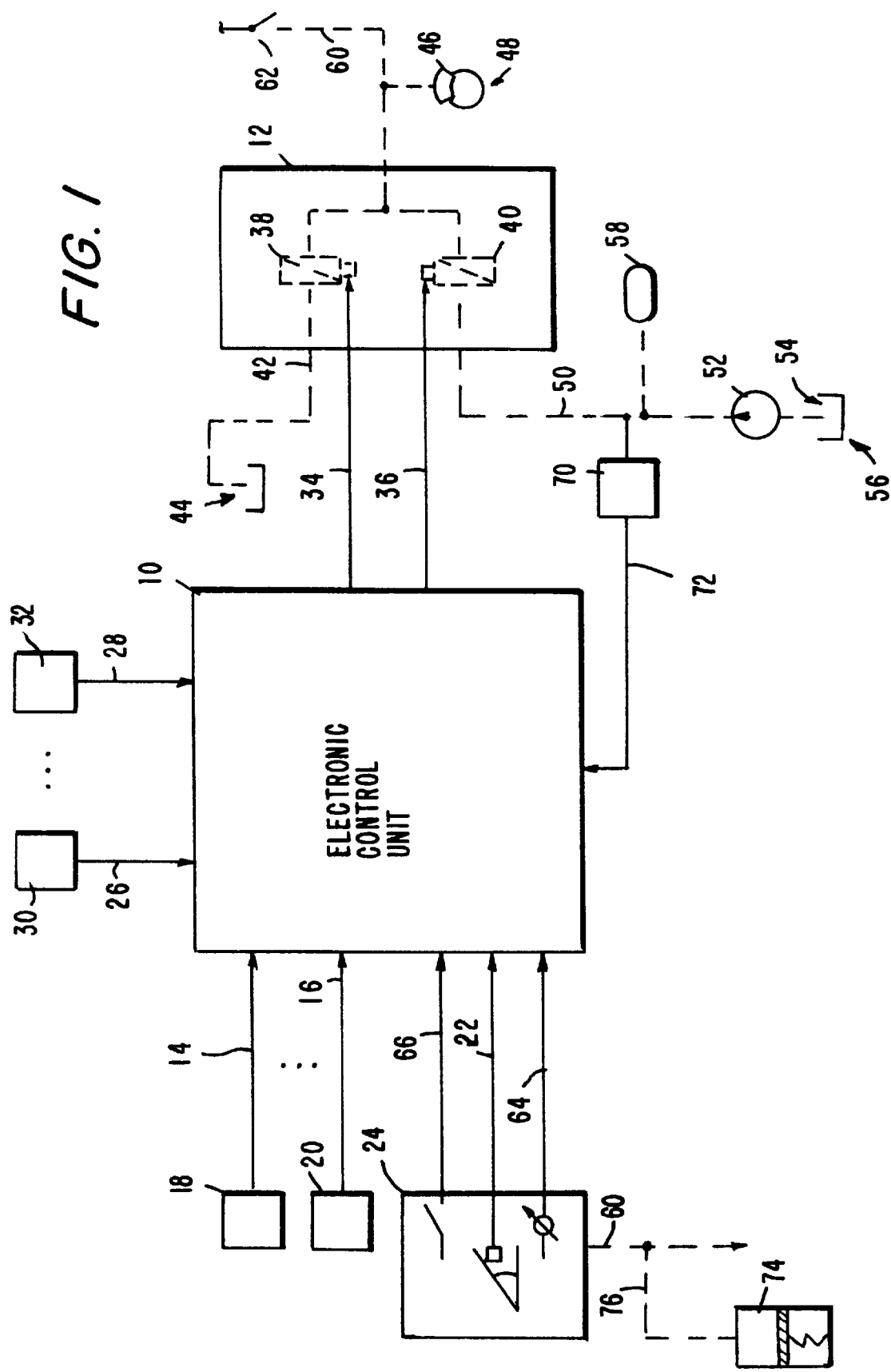

METHOD AND APPARATUS FOR TESTING THE BRAKE SYSTEM OF A VEHICLE

BACKGROUND OF THE INVENTION

The invention pertains to a method and to an apparatus for testing the brake system of a vehicle having electrically actuated valves.

A brake system for a vehicle in which the brake pressure in the wheel brakes of the vehicle is adjusted by the actuation of a valve assembly as a function of the braking command derived from the driver's actuation of the brake pedal is known from DE-A 41 12 137. In an electrical brake system such as this, it is also provided that, if the electrical control fails, a conventional hydraulic control of the wheel brakes depending on the actuation of the brake pedal can be activated. When the electrical control fails, the driver can therefore decelerate the vehicle and bring it to a stop by actuating the brake pedal. To do this, he must apply the required brake pressure to the wheel brakes by way of the pedal and the brake cylinder of the hydraulic brake system. To ensure the operational reliability of this electrohydraulic brake system, it is necessary for this emergency system to be tested even during normal operating conditions, because a failure of the emergency system after the breakdown of the electrical control can lead to the failure of the entire brake system. A particular problem in this context is the presence of an unacceptable amount of undissolved gas in the brake fluid of the closed emergency brake circuit.

SUMMARY OF THE INVENTION

The object of the invention is to provide measures for testing the brake system of a vehicle by means of which an emergency brake system of an electrohydraulic brake can be tested especially with respect to the presence of undissolved gas in the hydraulic circuit.

This is achieved by building up pressure in at least one wheel brake and monitoring at least one variable characterizing the pressure buildup. When the variable exceeds a predetermined limit value, undissolved gas is determined to be present.

In a first preferred embodiment, the characterizing variables are the master cylinder pressure and the brake pedal travel. If the master cylinder pressure is less than a predetermined pressure value, and the pedal travel exceeds a limit value assigned to the predetermined pressure value, gas is determined to be present.

In a second preferred embodiment, the characterizing variable is the pressure in a hydraulic medium storage chamber. When the drop in this pressure exceeds a maximum allowable value which is a function of temperature, discharge characteristic, and pressure-volume curves of the wheel calipers, gas is determined to be present.

The solution according to the invention ensures the operational reliability of an electrohydraulic brake system with a hydraulic emergency brake system. Especially advantageous is that this testing can occur even while the brake system is operating normally.

Not only can an unacceptable amount of undissolved gas in the brake fluid of the brake system be detected, but very small amounts of gas can be detected.

The test to be conducted to detect gas can be completed in a very short period of time and the quantity or volume of gas present in the brake fluid can be determined.

No additional sensors are required for this test. The test is based solely on the signals from sensors which are already present.

The presence of gas can be detected by the intentional change of pressure in the individual wheel brakes, and in this way different sections of the brake lines can be tested independently of each other for the presence of unallowable amounts of gas.

Additional advantages can be derived from the following description of exemplary embodiments.

BRIEF DESCRIPTION OF THE DRAWING

FIG. 1 shows a block circuit diagram of an electrohydraulic brake system;

DESCRIPTION OF THE EXEMPLARY EMBODIMENTS

Figure 2A:
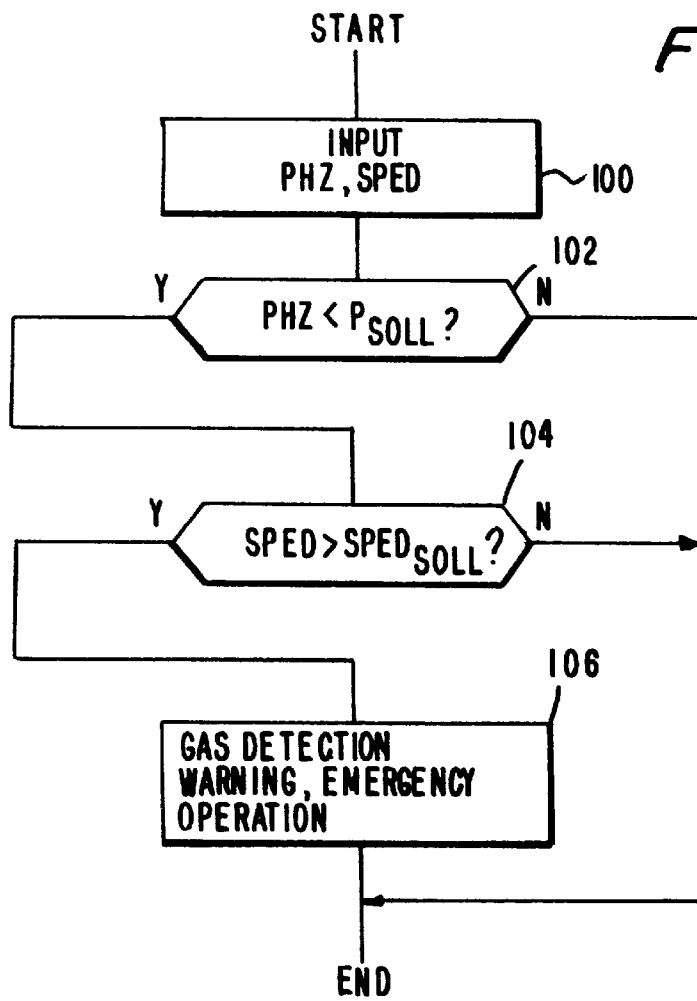
FIG. 2a is a flow diagram of a first embodiment.

FIG. 1 shows a block circuit diagram of an electrohydraulic brake system of a vehicle. An electronic control unit 10 is shown, which controls a hydraulic brake system 12 provided with appropriate valve assemblies. Connected to electronic control unit 10 are input lines 14–16 from measuring devices 18–20 for detecting the braking pressures, moments, or forces built up in the wheel brakes; an input line 22 from at least one measuring device 24 for detecting the extent to which the brake pedal is actuated; and input lines 26–28 from measuring devices 30–32 for detecting additional operating variables of the brake system or of the vehicle such as wheel speeds, vehicle velocity, etc. In the preferred exemplary embodiment, measuring device 24 is a hydraulic master brake cylinder, near which the pressure influenced by the actuation of the brake pedal is detected, the corresponding measurement value being sent over line 64 to control unit 10. Measuring device 24 also includes at least one position sensor, which detects the position of the brake pedal and transmits a corresponding variable over line 22 to control unit 10. A brake light switch is also a component of measuring device 24. The status of this switching element is transmitted over line 66 to control unit 10.

Electronic control unit 10 controls the electrically actuated valves of hydraulic brake system 12 over output lines. For reasons of clarity, only output lines 34 and 36 are shown, which drive pressure release valve 38 and pressure buildup valve 40 assigned to a wheel brake.

Pressure release valve 38, which, in the preferred exemplary embodiment, is in the closed position when unactuated and in the open position when actuated, is inserted in a hydraulic line 42, illustrated in broken line, which leads from a reservoir 44 to brake cylinder 46 of a wheel 48. In a corresponding manner, pressure buildup valve 40, which, in the preferred exemplary embodiment, is also in the closed state when not actuated and open when actuated, is inserted in a hydraulic line 50, which leads from a pressure-generating pump 52 to wheel brake 46. On the intake side, pump 52 is connected by way of a hydraulic line 54 to a reservoir 56, which can be identical to reservoir 44. A high-pressure hydraulic medium storage chamber 58 is connected to hydraulic line 50. A pressure sensor 70, which carries a corresponding pressure signal over line 72 to electronic control unit 10, is connected to line 50, to storage chamber 58, or to the line near storage chamber 58 to detect the pressure in storage chamber 58.

In addition, the pressure in wheel brake cylinders 46 can be influenced directly by the driver by actuation of the brake pedal via hydraulic line 60, which is connected to wheel brake 46 and also to the master brake cylinder, not shown. This connection is active only in the case of a defect in the electrical system, which is symbolized in FIG. 1 by a switching element 62.

A pedal travel simulator 74 is also provided, which, in the preferred exemplary embodiment, is connected by way of hydraulic connection 76 to hydraulic line 60 proceeding from the master brake cylinder or to a pressure volume in the area of the master brake cylinder which can be influenced by the actuation of the brake pedal. The purpose of the pedal travel simulator is to modify the behavior of the brake pedal so that, when the driver actuates the pedal, it feels as if he were operating a conventional, purely hydraulic brake system even though the brake system is being controlled electrically.

For reasons of clarity, the hydraulic part of the brake system is illustrated for only one wheel brake. Corresponding assemblies are present at least for the wheel brakes of the same axle or for all wheel brakes of the vehicle.

Under normal operating conditions, electronic control unit 10 determines the driver's braking command from the degree of actuation of the brake pedal, which is transmitted over line 22 and/or line 64. This command is converted to a desired value for the brake pressure to be produced at the individual wheel brakes. Within the scope of a pressure control circuit, this pressure is produced by the actuation of valves 38, 40 under consideration of the measured pressure. While the pressure is being built up, pressure medium flows from the reservoir via pump 52 and/or from storage chamber 58 via line 50 through open pressure buildup valve 40 and into a brake cylinder or caliper 46 of a wheel 48. So that the pressure can be released, pressure buildup valve 40 is closed, and pressure release valve 38 is opened so that pressure medium can flow back to the reservoir through line 42. Electronic control unit 10 also comprises an antilock and/or drive slip controller, which monitors the wheel speeds and can release or build up the pressure in the appropriate wheel brake when one or more of the wheels is showing a tendency to lock or spin.

In other advantageous exemplary embodiments, the driver's brake command is realized not only by the regulation of the pressure in the wheel brakes but also by the regulation of the braking moment, the braking force, the wheel speed, the wheel slip, etc.

If the electronic control unit fails after the loss of supply voltage, for example, or in cases of problems with electronic control unit 10, etc., the hydraulic emergency brake system is activated, so that the driver can take direct action on the wheel brakes to decelerate the vehicle. If, after the electronic control system has failed, an unacceptably large amount of undissolved gas is present in the hydraulic emergency brake circuit, the driver cannot build up enough braking force in the wheel brakes. This can result in unwanted operating situations. The braking action can be impaired by undissolved gas between the master brake cylinder and the pedal travel simulator and/or by undissolved gas in the area of the storage chamber, the valve assemblies, the wheel brakes, and/or the brake lines of these areas.

It is therefore provided in accordance with the invention that, as part of a testing procedure, the presence of undissolved gas in the hydraulic fluid of the brake system can be recognized promptly.

If there is gas in the area between master brake cylinder 24, pedal travel simulator 74, and switching element 62 inserted in brake line 60, the undissolved gas present there can significantly impair the braking action after failure of the electrical control system. According to the invention, therefore, the characteristic of the pedal behavior is monitored in this area during normal operation of the brake system, that is, while the electrical control system is operating properly, on the basis of three values describing the position of the brake pedal, namely, the status of the brake light switch, the master brake cylinder pressure, and the pedal travel. By means of plausibility tests of these three values, the presence of undissolved gas in this area of the brake system is recognized when the pedal travel associated with a certain pressure in the master brake cylinder has increased. A preferred exemplary embodiment of this solution is illustrated in FIG. 2a.

In addition, the braking action can also be impaired in emergency situations by undissolved gas in the area of the brake lines, the valve assemblies, the storage chamber etc. So that these impairments of the braking action can be recognized, two advantageous routes toward a solution are proposed.

First, each time the brakes are actuated during normal operating conditions, that is, under electrical control, in cases where pump 52 is not required to build up the braking pressure, the maximum allowable drop in pressure in the storage chamber 58 is calculated at a certain steady-state brake pressure. This value is a function of temperature, of the storage chamber discharge characteristic, and of the characteristic pressure-volume curves of the wheel calipers. In addition, it is also advantageous to include the pressure prevailing in the storage chamber before the braking process in the calculation. In a preferred exemplary embodiment, appropriate characteristic curves which assign a maximum allowable drop in storage chamber pressure to the measured brake pressure are stored for the specific brake system in question. The presence of undissolved gas is revealed by more elasticity in this area of the brake system and therefore by the occupation of a greater volume of the storage chamber. The case in which a defined limit value is exceeded is therefore detected, and it is concluded that an unacceptable amount of undissolved gas is present when the limit value is exceeded several times or when it is exceeded by a mean value from several braking processes, whereupon the appropriate measures can be initiated.

Figure 3:
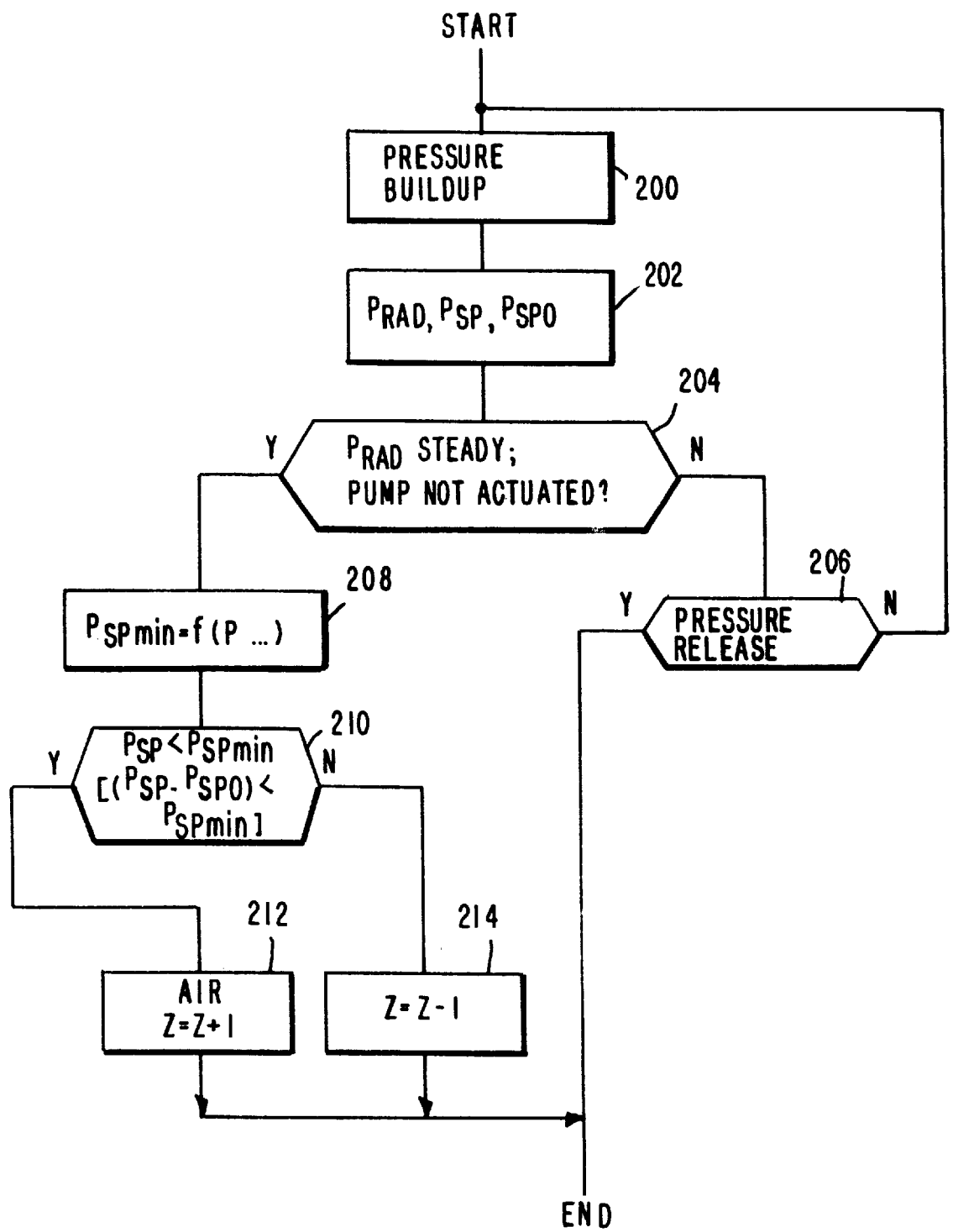
FIG. 3 is a flow diagram of a second embodiment.
Figure 4:
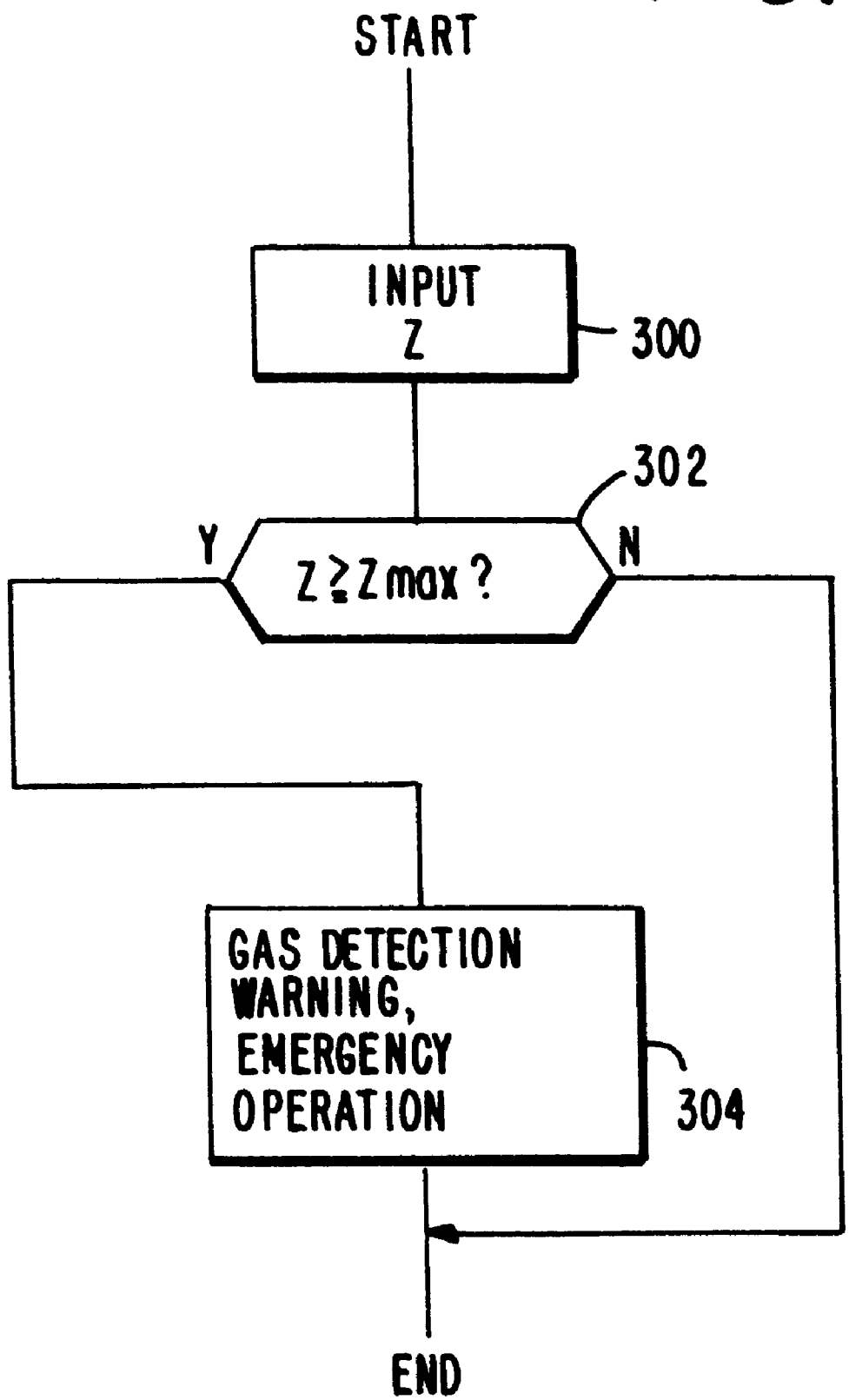
FIG. 4 is a further flow diagram for the second embodiment.

Another solution, especially for areas of the brake system which cannot be monitored during operation of the brakes, is to feed pressure actively from the storage chamber into at least one of the wheel brakes while the vehicle is standing still. This can be part of a so-called "predrive check" before the driver actually drives off. For this purpose, the pressure buildup valves of the wheel brake are supplied with power in accordance with a predetermined pattern, e.g., corresponding to a ramp, and the pressure which is reached is measured. Then conclusions concerning the presence of gas in the system are drawn from the reaction of the brake pressure and the drop in pressure in the storage chamber. Exemplary embodiments of these two solutions are illustrated in FIGS. 3–5.

The solution according to the invention is implemented in the preferred exemplary embodiment as a computer program running on a microcomputer containing electrical control unit 10.

Various realizations are conceivable with respect to the recognition of undissolved gas in the area of the master brake cylinder and the pedal travel simulator on the basis of plausibility considerations of the brake light switch, pressure sensor, and pedal travel sensor signals. A preferred form of realization is illustrated in FIG. 2.

Under the assumption that the sensors for the master brake cylinder pressure and the pedal travel are free of defects, the subprogram illustrated there is initiated when the brake pedal is actuated and the brake light switch is closed. It then repeats at given times, such as at time intervals of 5–20 msec. In the first step 100 of the subprogram shown, the measurement values of pressure sensor PHZ and of pedal travel sensor SPED are accepted as input. Then, in step 102, the measured pressure value is compared with a predetermined pressure $P_{Soll}$. If the master cylinder pressure is greater than or equal to this predetermined pressure value, the subprogram terminates and repeats at the given time, as long as braking continues. If the master cylinder pressure is less than the predetermined pressure value, the program checks to see in the following question step 104 whether or not the measured pedal travel SPED is greater than a pedal travel $SPED_{Soll}$ assigned to the predetermined pressure value $P_{Soll}$. If this is not the case, it is assumed that there is no undissolved gas in this section of the brake system. If the pedal travel is greater than the travel assigned to the predetermined pressure value, however, then in step 106 it is assumed that there is an unacceptable amount of undissolved gas in this section of the brake system. In a corresponding manner, warning signals are transmitted in this case and possibly emergency operating conditions are initiated, including restrictions on power or velocity. Then the subprogram terminates and is repeated at the given time.

Figure 2B:
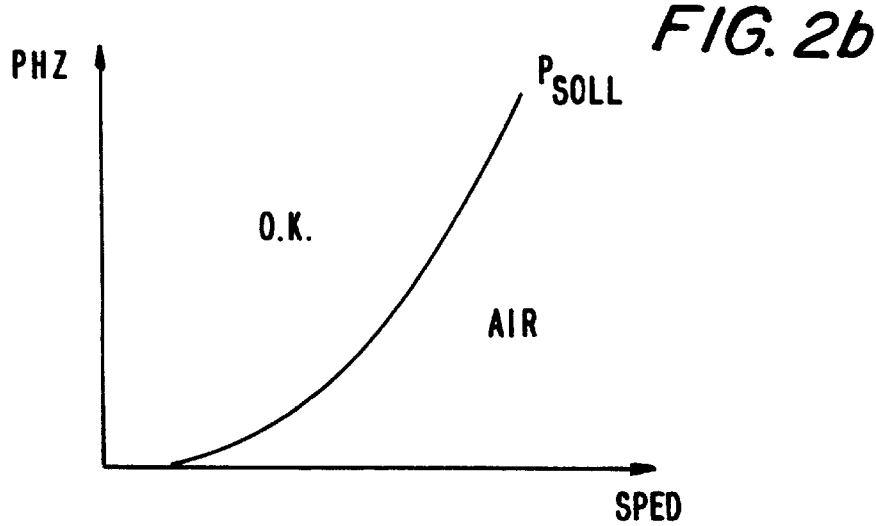
FIG. 2b is a plot of master cylinder pressure versus pedal travel for the first embodiment.

FIG. 2b shows a plot of the master brake cylinder pressure versus the pedal travel. The curve of the pressure $P_{Soll}$ as a function of the pedal travel is shown. If the master cylinder pressure is above $P_{soll}$, the system is o.k.; if it is below, it is assumed that there is gas in the brake system. In addition, if the difference exceeds a predetermined maximum value or if the sign of the difference is different, it is assumed that there is a defect in the area of the sensors.

To recognize an unacceptable amount of undissolved gas in the area of the wheel brakes, valve assemblies, and pump, a second embodiment is illustrated on the basis of the flow charts in FIGS. 3 and 4.

Depending the type of application, the illustrated subprogram is initiated either during a braking process at predetermined time intervals after actuation of the brake pedal or during, for example, a predrive check while the vehicle is standing still without any actuation of the brakes.

After the subprogram shown has begun to run in one of the operating situations described above, pressure is built up in at least one of the wheel brakes in first step 200 by the appropriate actuation of the pressure buildup valves. This is done as part of a normal braking process as a function of the braking command specified by the driver by his actuation of the brake pedal. If the vehicle is standing still, it is done in accordance with a defined pattern of actuation current, such as a time ramp. Then, in step 202, the pressure $P_{Rad}$ detected in at least one of the wheel brakes, the storage chamber pressure PSP detected in the area of the storage chamber, and possibly the storage chamber pressure PSPO before braking are determined and then checked in the following question step 204 to see if the brake pressure is steady and the pump has not been turned on. It is considered that a steady-state pressure level has been reached if the brake pressure has settled into a predetermined tolerance range, the actuation of the buildup valves to increase the pressure has ended, or a certain time has expired since the beginning of the pressure release phase. If one of the conditions checked in step 204 is not fulfilled, then in step 206 the program checks to see whether the pressure buildup process has been interrupted to release the pressure. If this is the case, the subprogram terminates and is repeated at the proper time. Otherwise, the subprogram continues with step 200 and with the continuation of the pressure buildup according to the specified values. If it has been found in step 214 that a steady-state pressure level has been reached without the actuation of the pump, then in step 208, on the basis of the brake pressure $P_{Rad}$ which has been reached, the maximum allowable storage chamber pressure drop $PSP_{min}$ is derived in accordance with a predetermined characteristic diagram or a model calculation. In the next step 210, the program checks to see whether the measured storage chamber pressure value PSP or the pressure drop as the difference between the starting pressure and the final pressure (PSPO-BSP) is smaller than the maximum allowable storage chamber pressure drop $PSP_{min}$. If this is the case, a counter Z is incremented in step 212, whereas in the opposite case, counter Z is decremented in step 214. After steps 212 and 214, the subprogram terminates and is repeated when called again.

Counter Z appearing in FIG. 3 is used for the statistical evaluation of the results of the comparison. To recognize an unacceptably large amount of undissolved gas in the brake system according to the method of FIG. 4, therefore, the status of counter Z is accepted as input at predetermined times in step 300 and compared in the following step 302 with a maximum value. If the maximum value is not reached, the subprogram shown in FIG. 3 terminates; otherwise, if the maximum value is reached, the program concludes in step 304 that there is an unacceptably large amount of undissolved gas in the brake system, generates a warning signal, and possibly initiates emergency driving operations. After step 304, the subprogram terminates.

In addition to the use of a counter, which increments when the maximum drop in storage chamber pressure is exceeded and decrements when the maximum is not exceeded, it is possible in other exemplary embodiments to use another statistical method of evaluation. In one advantageous exemplary embodiment, for example, the number of times the limit value is exceeded is detected, and, in the presence of a certain number of these occurrences, it is assumed that there is undissolved gas present in the brake system. In another advantageous exemplary embodiment, mean values of the storage chamber pressure or of the drop in the pressure and mean values of the maximum drop in the storage chamber pressure are calculated over the course of several braking processes or several predrive checks and, on the basis of the mean values, gas is detected by comparison of the mean measurement values with the mean limit value.

Figure 5A:
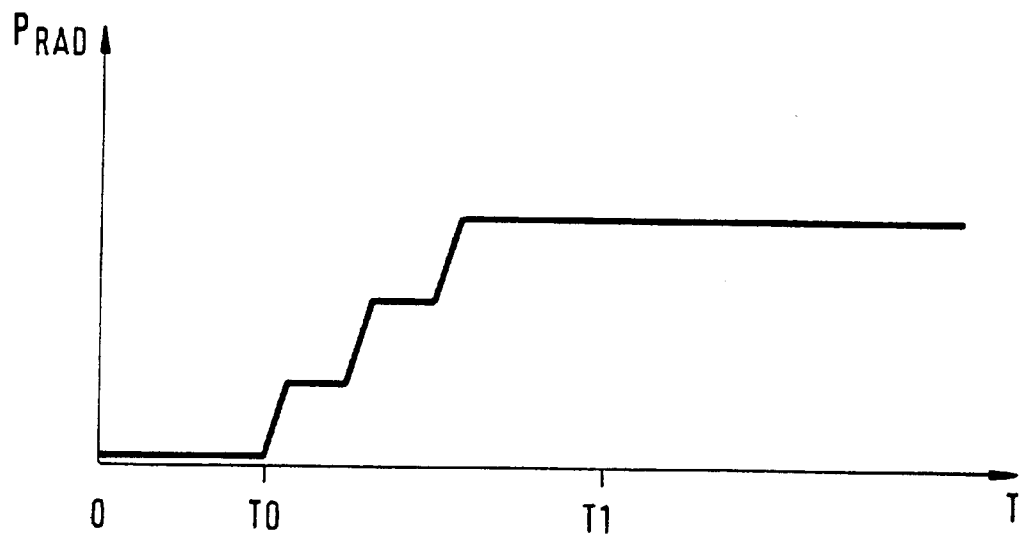
FIG. 5a is a plot of wheel brake pressure versus time for the second embodiment.
Figure 5B:
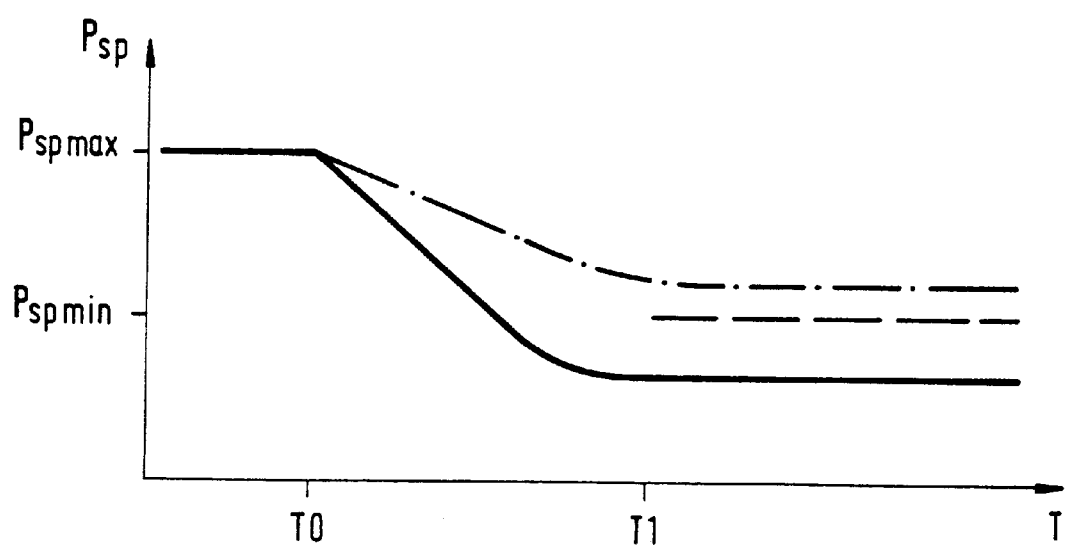
FIG. 5b is a plot of storage chamber pressure versus time for the second embodiment.

The method shown in FIGS. 3 and 4 is illustrated in FIG. 5 on the basis of time curves. FIG. 5a shows the change over time in the brake pressure in a wheel brake, whereas FIG. 5b shows the change over time in the storage chamber pressure. At time $T_0$, the pressure begins to build up in at least one of the wheel brakes as shown by the graph of FIG. 5a. At time $T_1$, it is assumed that the brake pressure has reached a steady state. In analogy to the buildup in brake pressure shown in FIG. 5a, FIG. 5b shows how the storage chamber pressure falls from a maximum value $PSP_{max}$ at time $T_0$ to a value at time $T_1$. In the presence of unacceptably large amounts of undissolved gas in the brake system, this value, as shown by the solid line, is below the maximum pressure drop $PSP_{min}$ assigned to time $T_1$, whereas it is above this limit value, as shown by the dash-dot line, when everything is operating properly.

The determination of the maximum allowable drop in the storage chamber pressure depends not only on the above-cited operating variables such as temperature, discharge characteristic, pressure/volume characteristic of the wheel calipers, but also on the number of wheel brakes in which the brake pressure is built up. Thus, for example, the brake pressure can be built up in all the wheel brakes during a braking process, which means that the volume of all the wheel brakes must be included in the determination of the limit value. Conversely, if the vehicle is standing still or if a predrive check is being conducted, only one or a predetermined selection of wheel brakes is supplied with pressure medium. In this case, the process of determining the maximum pressure drop value must consider the number of wheel brakes selected for pressure buildup.

In a preferred exemplary embodiment, the gas content is determined as a quantity and/or volume from predetermined, stored values for the difference between the maximum drop in the storage chamber pressure and the actual drop.

If an unacceptable amount of undissolved gas has been detected in the hydraulic fluid, the driver is informed that the emergency brake circuit is not fully available; in some advantageous exemplary embodiments, he is forced, either alternatively or additionally, by power restrictions, velocity restrictions, etc., to find a repair shop to have the brake system bled.

In the preferred exemplary embodiment, a pressure measurement value is used for evaluation. In other advantageous exemplary embodiments, the test described above is carried out on the basis of other variables representing the force exerted by the brake such as the application force. These variables can then be evaluated to implement the test according to the invention. In an advantageous exemplary embodiment, furthermore, it is not the storage chamber pressure which is compared with a limit value but rather, as mentioned above, it is the difference between the starting pressure in the storage chamber and the pressure reached at a steady-state pressure level which is compared with a corresponding limit value. Thus it is also possible to take into account a storage chamber which is not completely full.

I claim:

1. Method for testing a brake system of a vehicle having brakes supplied with hydraulic pressure by electrically actuated valve means, said brake system having a brake pedal adapted to be actuated by a driver, a brake caliper at each wheel, a pressure pump generating hydraulic pressure for said calipers, a master cylinder connected with the brake pedal, a pressure sensor for detecting the pressure in said master cylinder, and a sensor for detecting travel of the brake pedal, said method comprising:

detecting when the driver actuates the brake pedal;
   measuring the master cylinder pressure and the brake pedal travel;
   comparing the master cylinder pressure and the brake pedal travel with respective predetermined limit values representing respective limits of respective acceptable ranges thereof; and
   indicating a failure when said master cylinder pressure and said brake pedal travel are outside the corresponding limit value.

2. Method according to claim 1 wherein the brake system is an electrohydraulic brake system including an electrical system, said electrohydraulic brake system being switched over to purely hydraulic control in the event that the electrical system fails.

3. Method as in 1, wherein said pressure is built up by actuating said brake pedal, said predetermined values being a predetermined pressure value and a pedal travel limit value assigned to the predetermined pressure value, said driver being informed when said master cylinder pressure is below said predetermined pressure value and said pedal travel exceeds said limit value.

4. Method for testing a brake system of a vehicle having brakes supplied with hydraulic pressure by electrically actuated valve means, said brake system having a brake pedal adapted to be actuated by a driver, a brake caliper at each wheel, a pressure pump generating hydraulic pressure for said calipers, a storage chamber associated with said pressure pump for storing hydraulic medium and a pressure sensor for detecting the pressure in said storage chamber said method comprising:

building up pressure at at least one wheel;
   measuring the storage chamber pressure;
   detecting a drop in the storage chamber pressure on the basis of the measured storage chamber pressure;
   comparing said drop with a maximum allowable drop; and
   indicating a failure when said drop in the storage chamber pressure exceeds the maximum allowable drop.

5. Method according to claim 4, wherein the maximum allowable drop in the storage chamber pressure is calculated from a model or from a characteristic diagram as a function of temperature, discharge characteristic, characteristic pressure-volume curves of the wheel calipers, and possibly the number of wheel brakes supplied with braking pressure.

6. Method according to claim 4 wherein dissolved gas in the brake system is recognized when the maximum allowable drop in storage chamber pressure is exceeded several times, sufficiently often, or an average over several brakings.

7. Method according to claim 4 wherein the drop in storage chamber pressure is monitored each time an electrically controlled braking occurs.

8. Method according to claim 4 wherein the drop in storage chamber pressure is checked while the vehicle is standing still as part of, for example, a so-called predrive check before driving starts.

9. Method according to claim 4 wherein the actual drop in storage chamber pressure is monitored only when an auxiliary pressure source of the brake system is not operating.

10. Method according to claim 4 wherein the brake system is an electrohydraulic brake system including an electrical system, said electrohydraulic masster cylinder, and a sensor for detecting travel the brake pedal, said, apparatus comprising:

detection maeans for detecting when the driver actuates the brake pedal;
   measuring means for measuring the master cylinder pressure and the brake pedal travel;
   comparison means for comparing the master cylinder pressure and the brake pedal travel with respective predetermined limit values representing respective limits of respective acceptable ranges therof; and
   indication means for indicating a failure when said master cylinder pressure and said brake pedal travel are outside the corresponding limit value.

11. Apparatus for testing a brake system of a vehicle having brakes supplied with hydraulic pressure by electrically actuated valve means, said brake system having a brake pedal adapted to be actuated by a driver, a brake caliper at each wheel, a pressure pump generating hydraulic pressure for said caliper, a master cylinder connected with the brake pedal, a pressure sensor for detecting the pressure in said master cylinder, and a sensor for detecting travel the brake pedal, said apparatus comprising:

detecting means for detecting when the driver actuates the brake pedal; measuring means for measuring the master cylinder pressure and the brake pedal travel;

comparison means for comparing the master cylinder pressure and the brake pedal travel with respective predetermined limit values representing respective limits of respective acceptable ranges thereof; and indication means for indicating a failure when said master cylinder pressure and said brake pedal travel are outside the corresponding limit value.

12. Apparatus for testing a brake system of a vehicle having brakes supplied with hydraulic pressure by electrically actuated valve means, said brake system having a brake pedal actuated by a driver, a brake caliper at each wheel, a pressure pump generating hydraulic pressure for said calipers, a storage chamber associated with said pressure pump for storing hydraulic medium and a pressure sensor for detecting the pressure in said storage chamber, said apparatus comprising:

pressure build up means for building up pressure at at least one wheel;

measuring means for measuring the storage chamber pressure;

detection means for detecting a drop in the storage chamber pressure on the basis of the measured storage chamber pressure;

comparison means for comparing said drop with a maximum allowable drop; and indication means for indicating failure when said drop in the storage chamber pressure exceeds the maximum allowable drop.

\* \* \* \* \*

UNITED STATES PATENT AND TRADEMARK OFFICE
CERTIFICATE OF CORRECTION

PATENT NO. : 5,908,983
DATED : Jun. 1, 1999
INVENTOR(S) : Juergen Binder

It is certified that error appears in the above-identified patent and that said Letters Patent is hereby corrected as shown below:

In column 9, line 2, change "bya" to -- by a --.
In column 8, line 51-65, delete from "masster cylinder" to the end of this claim. In its place, insert -- system being switched over to purely hydraulic control in the event that the electrical system fails. --.

Signed and Sealed this

Fifteenth Day of August, 2000

Q. TODD DICKINSON

Attest:

Attesting Officer

Director of Patents and Trademarks